Dec. 18, 1928.  1,695,504
C. PEARSON
ADJUSTING MECHANISM FOR SWEEP RAKES
Filed Nov. 26, 1924  2 Sheets-Sheet 1
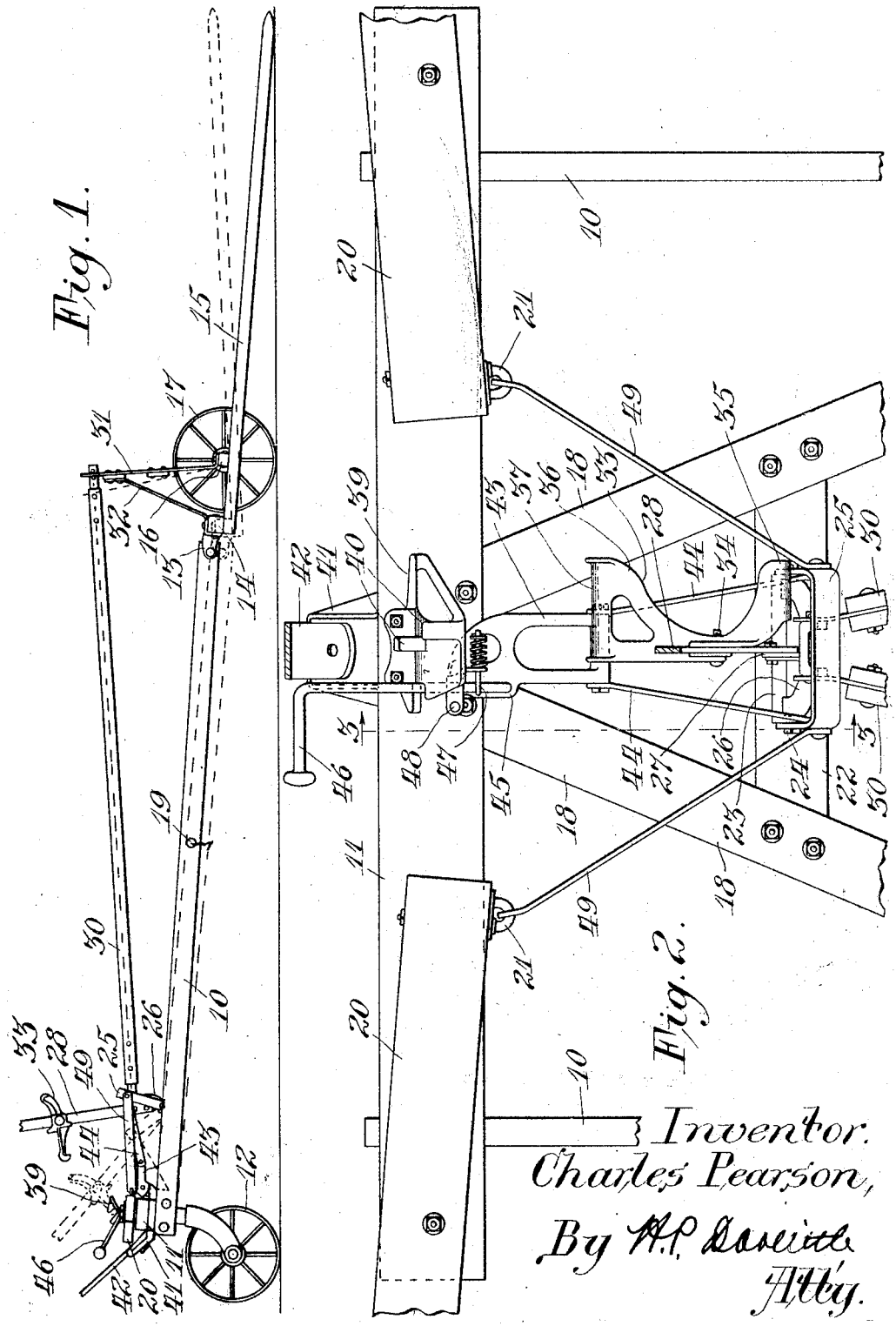
Inventor.
Charles Pearson,
By H. P. Davitt
Atty.

Dec. 18, 1928.
C. PEARSON
1,695,504
ADJUSTING MECHANISM FOR SWEEP RAKES
Filed Nov. 26, 1924   2 Sheets-Sheet 2
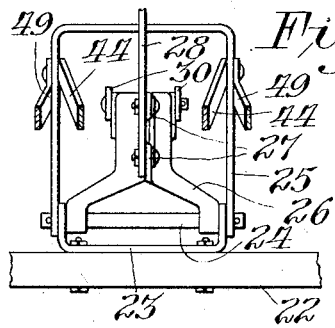
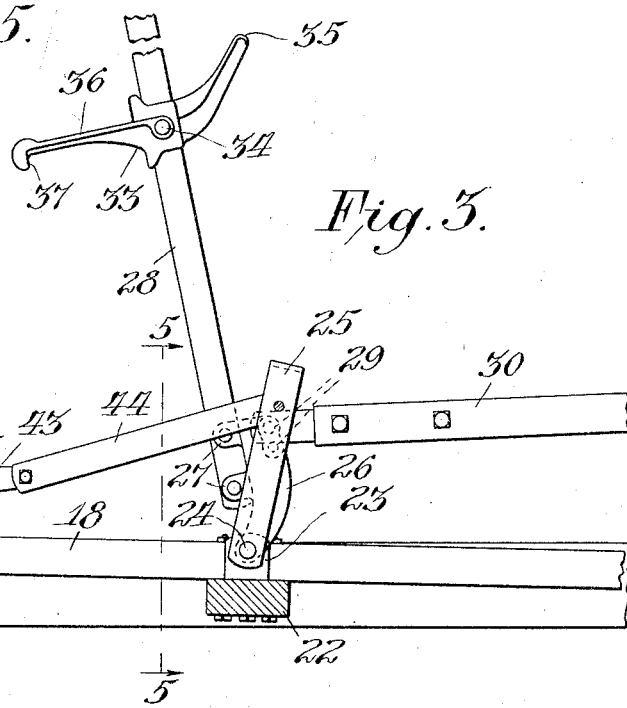
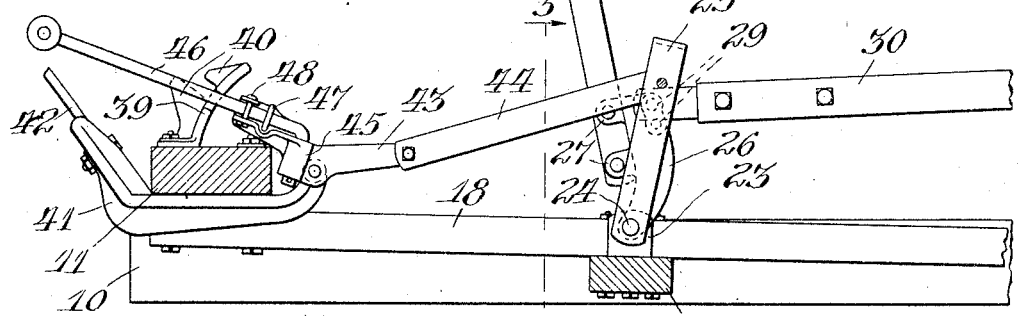
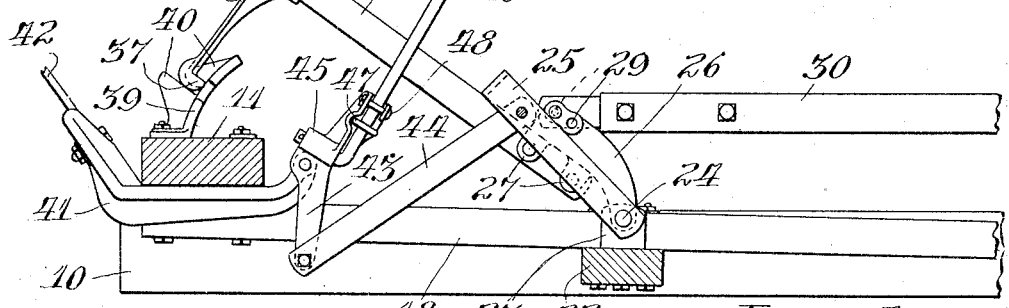
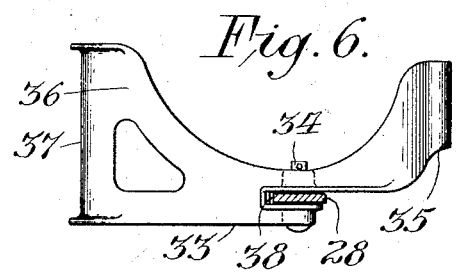
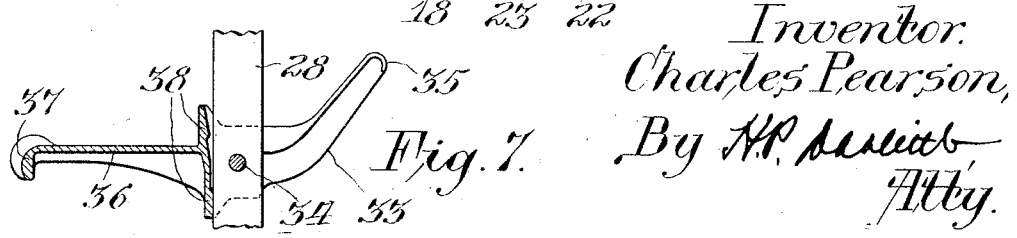
Inventor.
Charles Pearson,
By [signature]
Atty.

Patented Dec. 18, 1928.

1,695,504

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

ADJUSTING MECHANISM FOR SWEEP RAKES.

Application filed November 26, 1924. Serial No. 752,288.

The present invention relates to hay harvesting machines and especially a machine of the sweep rake type used for sweeping or gathering windrows or cocks of hay in a field and transporting the load to a barn, but usually to a stacking machine, for building the hay into a storage stack.

Machines of this type have been in long use and certain problems and difficulties in connection therewith have been encountered. Chief among these are the complexity of the mechanism necessary to perform the operation of gathering and transporting and effecting incidental adjustments; the cost of manufacturing such a complex structure; the exertion of much physical force in operating the lever mechanisms for adjusting the implement; and, most important, the failure of the raking teeth properly to contact the ground for efficiently performing the raking operation.

Accordingly it is an object of this invention materially to simplify the construction of these machines; to provide a novel and efficient adjusting mechanism which will permit the rake teeth yieldingly or floatingly to contact the ground during the raking operation; to provide a rake which may be easily adjusted for transporting the load either by a simple, manually movable lever mechanism or by such a lever mechanism assisted by the draft power of the animals which pull the machine; and lastly, to provide a machine which, because of its simplified construction, will be considerably reduced in cost and which, therefore, may be successfully exploited commercially.

Briefly, the machine comprises a wheel mounted frame, carrying a pivoted raking mounted platform and a freely movable hand lever for adjusting the platform to raised position as when the machine is used for transporting a load, or for permitting the rake platform yieldingly to contact the ground as when gathering the load. For the purpose of assisting the hand lever, an assisting means comprising either a foot lever mechanism or a draft power operated mechanism is provided for aiding the hand lever in adjusting the rake platform to raised position when carrying a load. When the rake platform is adjusted to its raised position, the hand lever has moved to its rearward limit of movement and, by means of a novel latch mechanism, is positively locked in position to retain the platform raised.

In the accompanying drawings the preferred embodiment of the invention is disclosed and like characters of reference denote like parts.

Fig. 1 is a side elevational view of a hay rake of the type described showing in full lines the machine as adjusted for gathering a load and, in dotted lines, the position of the parts when transporting a load;

Fig. 2 is an enlarged fragmentary view in plan of the rear part of the machine illustrating the improved adjusting mechanism;

Fig. 3 is a side elevational view of the lever mechanism taken along the line 3—3 of Fig. 2 and looking in the direction of the arrows. This figure illustrates the position of the parts when the hand lever is free to oscillate with the rake platform contacting the ground;

Fig. 4 is a similar view, but showing the parts in the position of adjustment when the rake platform is raised for transporting a load;

Fig. 5 is a sectional view of the mechanism taken along the line 5—5 of Fig. 3 and looking in the direction of the arrows;

Fig. 6 is a detail plan view of the gravity actuable locking pawl showing the integrally formed treadle and trip; and Fig. 7 is a side view, partly in section, of the same detail.

The frame structure of the implement mounting the improved lever mechanism is standard in this art, and, as shown in the drawings, comprises a pair of longitudinally extending side frame members 10, a rearwardly disposed and transversely extending cross frame member 11, these members comprising the main frame of the implement and carried at its end on a pair of trailing caster wheels 12, only one of them being shown. The front ends of the bars 10 pivotally carry brackets 13 and support the rear cross bar 14 of the rake platform made up of a plurality of longitudinally extending, spaced tines 15 additionally strengthened and tied together by another laterally extending cross bar 16 supported on the usual front pair of wheels 17 (only one being shown) enabling the rake platform to pivot about this axis. As shown, the main frame is further strengthened by a pair of forwardly extending, diverging bars 18 connected at their rear ends by suitable bolts to the cross frame member 11 and, at their forward ends, securely bolted to the side frame members 10 by a bolt 19. Upon opposite sides of the longitudinal, median line of the machine is a pair of pivotally mounted draft bars 20, the inner ends thereof being provided with eye bolts 21 for a purpose to be hereinafter described, and the outer ends being provided with a conventional means for attaching singletrees for harnessing a draft animal to each side of the machine. This singletree structure has not been illustrated, as it is well known in this art.

The mechanism for effecting adjustment of the rake platform will now be described. Adjacent the rear cross bar 11 and slightly forwardly thereof the frame members 18 carry a cross piece 22. This cross piece 22 has securely arranged thereon a cleat-like member 23 having upstanding ears which are apertured to receive pintles 24 upon which is pivotally mounted a U-shaped or bail member 25. Mounted between the leg portions of the bail on the pintles 24 is a pivoted hand lever bracket 26 provided with a pair of bosses 27 at its rear side, to which is securely bolted a hand lever 28. The upper forward side of the hand lever bracket has a plurality of apertures 29 for selectively receiving the rear ends of a pair of adjusting members 30, which extend forwardly and are connected to the usual upwardly extending head members 31 of the rake platform. This rake platform head 31 is suitably braced by braces 32 connected to it and to the cross bar 14. The lever 28 is not locked normally, but has a free pivotal movement on the pintles 24, such movement resulting during the gathering operation from the free up and down movement of the rake tines 15 traveling over and conforming with the contour of the ground.

Pivoted for a limited pivotal movement on the hand lever 28 and in a position thereon accessible by the operator's foot is a gravity actuable pawl 33 pivoted on a pin or bolt 34, and comprising a forwardly and upwardly extending foot trip portion 35 and a rearwardly extending foot treadle portion 36, and a pawl hook 37. The movement of this member on the hand lever is limited by stops 38. The purpose of this member will later be described.

Of course, there must be some limit of movement to the hand lever 28 in a forward direction for permitting the floating action of the rake teeth and dropping thereof into hollows. This dropping movement and forward swinging of the lever is limited by the bight of the bail 25. The rear cross bar 11 carries a duplex locking or latch plate 39. The latch 40 of this plate limits the rearward swinging movement of the hand lever 28 and upward float of the platform, because in its rearward swinging movement the pawl hook 37 will engage the members 40 and lock; thus, the angular distance between the members 40 and the bail 25 determines the amount of float which the lever and platform are capable of having in raising the platform when loaded. A pull rearwardly on the hand lever 28 when adjusting the platform will stop this float and at its rearward limit of movement the pawl hook 37 locks between the members 40 and positively retains the load in elevated position for transport to the stacking machine or barn.

It will be appreciated that the hand lever by itself would not efficiently raise the platform if heavily loaded, and thus it is desirable that some means be provided for assisting the hand lever, thereby materially reducing the expenditure of physical effort on the part of the operator and so increasing the ease in operation of the machine. This takes us back to the bail 25, which also serves this purpose as will now be described. In the normal gathering operation, as shown in Fig. 3, it is spaced an angular distance from the hand lever 28. By moving it rearwardly to abut and engage the hand lever 28 it can be made to assist in moving the lever 28 rearwardly for raising the platform and load. For this purpose, a foot lever mechanism is provided, which will now be described. A seat bracket 41 carrying the usual seat spring 42 for the seat of the operator, not shown, is bolted to the under side of the cross bar 11 between the bar 11 and frame members 18. The forward end of this bracket extends upwardly and has pivotally connected thereto a foot lever bracket 43 having an end extending forwardly of its pivotal connection to the bracket 41 and having another end extending rearwardly of this pivotal point. The forward arm of the foot lever bracket has pivotally connected thereto a pair of links 44 which are pivotally connected to the legs of the bail 25, as shown. A socket 45 is integrally formed in the foot lever bracket casting adjacent and rearwardly of its pivot to the seat bracket. This socket receives the angularly bent extension of a foot lever 46. The socket enables, as will be understood, a lateral swinging movement of the foot lever which may be locked in a side marginal slot in the locking or latch plate 39. When the foot lever is in locked position it is normally held there by means of a spring-urged eye bolt 47 encircling the lever. By means of a pin 48 disposed in ears extending laterally from the rear arm of the foot lever bracket, the outer or lateral movement of the foot lever is limited. From this construction it will be appreciated that the bail 25, which may be called a hand lever assisting means, is connected to the foot lever mechanism for operating it by a toggle connection. There is thus provided a foot operable mechanism for assisting a hand operable mechanism, the two utilizing natural forces exerted by the operator in the operation of raising the load. By this is meant that the operator seated on his seat, by pulling rearwardly on the hand lever to raise the load, would, as part of this operation, naturally brace his feet to exert a maximum pulling effort with his arms. Instead of providing a foot rest so the operator might brace himself, the foot lever serves this purpose, it absorbing or taking up the force exerted by the foot to move the foot lever forwardly as the hand lever moves rearwardly.

The operator, however, by the mechanism of this invention need not even exert this much physical effort in adjusting the rake to raised position when loaded, for he may bring to his assistance the draft effort of the pulling animals. Attention is again directed to the bail member 25, which has been termed the lever assisting means or member. This bail, as shown in Fig. 2, has the outer sides of its legs connected by draft links 49 pivoted thereto to the eye bolts 21 disposed at the inner ends of the pivotally mounted draft bars 20. Thus, when the operator desires to adjust the rake with a minimum of effort, he moves the foot lever 46 laterally out of its locking slot in the latch plate to release the bail 25, whereupon a forward pull by the draft animals moves the inner ends of the bars 20 rearwardly to pull on the draft links 49 for moving the bail 25 to contact and push rearwardly the hand lever 28. Thus, the hand effort, foot effort and draft effort may all be combined simultaneously to effect an easy adjustment of the rake when heavily loaded.

The operation of the machine should now be understood, as it has been described in connection with the description of the construction of the machine, and it is not thought necessary further to describe this matter. It will be understood that the selective adjustment of the adjusting members 30 in the apertures in the hand lever bracket 26 permits of a change in the leverage and extent of adjustment which may be imparted to the rake platform.

It should also be understood that when the platform is in raised position the hook 37 of the gravity pawl is locked between the members 40 on the latch plate. With the parts in such locked position and after the load has been taken up by the stacking machine, the platform may be returned to ground contacting position by kicking the foot trip 35 formed on the pawl, which will release the hook from the latch plate. The parts before releasing the hook from the latch are as shown in Fig. 4, and, if it is difficult to effect this release, because of the inertia of the parts, it may be easily displaced by exerting a slight pressure on the foot lever 46, which, through the toggle connection, moves the bail 25 to move the lever 28 rearwardly, thereby loosening the hook on the pawl to such an extent that a slight kick on the trip part will quickly release it.

Another point to be considered is the foot treadle formed on this pawl member. This is especially useful when gathering a load, for, by pressing against the foot treadle, the hand lever 28 can be moved forwardly a little so that the adjusting members 30 push on the rake head 31 to make the tines 15 more aggressively contact the ground to make a clean job of gathering and raking.

All of the objects of this invention have thus been achieved, and, while there has been shown the preferred form of the invention, it will, of course, be understood that the same is capable of modification and that such modification may be resorted to by skilled workmen without departing from the spirit of this invention as claimed in the subjoined claims.

What is claimed is:

1. In a hay rake, the combination of a frame, a rake platform mounted thereon for up and down movement, a lever on the frame for adjusting the platform to raised position, means on the frame for assisting the lever to adjust the platform to this position, and means on the lever independent of the assisting means and operative upon movement of the lever by the assisting means for locking the lever to retain the platform in raised position.

2. In a hay rake, the combination of a frame, a rake platform pivoted thereon, a lever on the frame for adjusting the platform, a member on the frame engageable with the lever to assist it in adjusting the platform, and a member pivoted on the lever, said member being independent of the assisting means and operative upon movement of the lever by the assisting member for locking the lever to retain the platform in adjusted position.

3. In a hay rake, the combination of a frame, a rake platform mounted thereon for up and down movement, a lever on the frame for adjusting the platform to raised position, means on the frame for assisting the lever to adjust the platform to this position, a second lever for moving the assisting means, a pawl on the first lever independent of the assisting means, and a latch on the frame for cooperating with the pawl to retain the platform in raised position.

4. In a hay rake, the combination of a frame, a rake platform pivoted thereto for adjustment to raised and lowered positions, a lever on the frame for making these adjustments, an assisting means on the frame engageable with the lever to move it but normally spaced therefrom and being movable independently thereof to permit a limited free movement of the lever whereby the platform has a free floating action in its lowered position, and means on the lever independent of the assisting means operable upon movement of the lever by the assisting means to lock the platform in its raised position.

5. In a hay rake, the combination of a frame, a rake platform pivoted thereto for adjustment to raised and lowered positions, a lever on the frame for making these adjustments, an assisting means engageable with the lever to move it but normally spaced therefrom and being movable independently thereof to permit a limited free movement of the lever whereby the platform has a free floating action in its lowered position, and a pawl pivoted on the lever independently of the assisting means and being operable to engage a latch on the frame to lock the platform in its raised position upon movement of the lever.

6. In a hay rake, the combination of a frame, a rake platform pivoted thereon, a bracket pivoted on the frame and carrying a lever, means carried by the bracket for connecting the lever and platform for adjusting the platform, a member pivoted on the lever, and a latch on the frame adapted to be engaged by the pivoted member to lock the lever and platform in adjusted position.

7. In a hay rake, the combination of a frame, a rake platform pivoted thereon, a lever pivoted on the frame and connected to the platform for adjusting it, an assisting member pivoted to the frame and being normally spaced from the lever, draft power means connected to the assisting member for moving it to engage and assist the lever in adjusting the platform, and means on the lever independent of the assisting member for locking it to retain the platform adjusted.

8. In a hay rake, the combination of a frame, a rake platform pivoted thereon, a lever pivoted on the frame for fore and aft movement and connected to the platform for adjusting it from ground contacting to raised position, said lever having a limited free movement for permitting the platform to rise and fall when contacting the ground, means independent of and spaced from the lever to limit its movement in a forward direction to control the fall of the platform in this position, a second means independent of the lever to limit its movement in an aft direction to control the rise of the platform in this position, and means on the lever engageable with the second mentioned limiting means to lock the lever and platform in raised position.

9. In a hay rake, the combination of a frame, a rake platform thereon, a lever for adjusting the platform to raised position, a second lever for adjusting the platform to raised position, and a latch member on the frame, the first lever carrying means independent of the second lever for locking with said latch member to hold the platform raised, and the second lever locking with said latch member when the platform is lowered.

10. In a hay rake, the combination of a frame, a rake platform thereon, a pair of levers for adjusting the platform to raised position, means connecting the levers for cooperative movement, and means on the frame for locking one of the levers when the platform is raised, the same means locking the other lever when the platform is lowered.

11. In a hay rake, the combination of a frame, a rake platform thereon, cooperating hand and foot levers for raising the platform, and a single member on the frame for locking the hand lever to hold the platform raised and to lock the foot lever when the platform is lowered.

12. In a hay rake, the combination of a frame, a rake platform pivoted thereon, a freely movable lever on the frame for adjusting the platform, a lock on the frame, and a pawl comprising a treadle and trip pivoted on the lever for engaging the lock to hold the platform adjusted.

13. In a hay rake, the combination of a frame, a rake platform adjustably mounted thereon, a freely movable hand lever pivoted on the frame for adjusting the platform, a latch plate on the frame, and a pawl having a limited pivotal movement pivoted on the lever and comprising a treadle and trip for engaging the latch plate for locking the lever to hold the platform in adjusted position.

14. In an adjusting mechanism for implements having a frame and a member to be adjusted, the combination of a lever carrying a latch member, means for engaging the lever to move it, a lever for operating said moving means, and a lock member on the frame having a laterally extending notch, said notch serving as a lock for the last mentioned lever, and means for causing the latch member to lock on the lock member on the frame.

15. In an adjusting mechanism for implements having a frame and a member to be adjusted, the combination of a lever carrying a latch member, means for engaging the lever to move it, a second lever for moving the moving means, and a notched latch plate for the levers, said second lever being laterally movable from the notch and then upwardly movable with respect to the plate to move the moving means.

16. In a hay rake, the combination of a frame, a rake platform mounted thereon for up and down movement, a lever for adjusting the platform to the up position, means on the frame normally spaced forwardly of said lever and movable to contact the lever to assist it in raising the platform, a stationary lock on the frame, and a latch member pivotally carried on the lever for co-operation with the lock to hold the lever in locked position with the platform raised.

17. In a hay rake, the combination of a frame, a rake platform pivoted thereto, a lever for raising and lowering the platform, a stationary lock on the frame, and a member pivoted on the lever having a treadle latch portion and a tail portion, the latch portion being engageable with the lock to lock the lever and platform in raised position.

In testimony whereof I affix my signature.

CHARLES PEARSON.